(12) United States Patent
Ciraci et al.

(10) Patent No.: US 11,258,876 B2
(45) Date of Patent: Feb. 22, 2022

(54) DISTRIBUTED FLOW PROCESSING AND FLOW CACHE

(71) Applicant: MICROSOFT TECHNOLOGY LICENSING, LLC, Redmond, WA (US)

(72) Inventors: Selim Ciraci, Redmond, WA (US); Shekhar Agarwal, Redmond, WA (US); Geoffrey Outhred, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/987,310

(22) Filed: Aug. 6, 2020

(65) Prior Publication Data
US 2021/0329087 A1    Oct. 21, 2021

Related U.S. Application Data

(60) Provisional application No. 63/012,018, filed on Apr. 17, 2020.

(51) Int. Cl.
*G06F 15/173* (2006.01)
*H04L 67/5681* (2022.01)
(Continued)

(52) U.S. Cl.
CPC ...... *H04L 67/2847* (2013.01); *G06F 12/0811* (2013.01); *H04L 43/026* (2013.01); *H04L 67/322* (2013.01); *G06F 2212/1021* (2013.01)

(58) Field of Classification Search
CPC . H04L 67/2847; H04L 67/322; H04L 43/026; G06F 12/0811; G06F 2212/1021
(Continued)

(56) References Cited

U.S. PATENT DOCUMENTS 9,998,955 B1    6/2018   MacCarthaigh
10,382,358 B1*  8/2019   Jain .................... H04L 67/1089
(Continued)

OTHER PUBLICATIONS

"Alibaba Cloud Server Load Balancer", Retrieved from: https://static-aliyun-doc.oss-cn-hangzhou.aliyuncs.com/download%2Fpdf%2F126981%2FInstance_intl_en-US.pdf?spm=a2c63.p38356.879954.4.16b36a82uafRmD&file=download%2Fpdf%2F126981%2FInstance_intl_en-US.pdf, Feb. 28, 2020, 42 Pages.
(Continued)

*Primary Examiner* — Thuong Nguyen
(74) *Attorney, Agent, or Firm* — Scott Y. Shigeta; Newport IP, LLC

(57) ABSTRACT

The techniques disclosed herein improve the efficiency, reliability and scalability of flow processing systems by providing a multi-tier flow cache structure that can reduce the size of a flow table and also reduce replicated flow sets. In some configurations, a system can partition a flow space across workers and replicate the flows within a partition to a set of workers. In some configurations, a flow cache structure can include three tiers: (1) a scalable flow processing layer for executing the actions and transformations of a flow, (2) a flow state management layer for managing distributed flow state decisions, and (3) a flow decider layer for identifying actions and transformations needs to be executed on each packet of a flow. Flow replications allow other workers to pick up flows allocated to a particular worker that is taken offline in the event of a crash or update.

20 Claims, 7 Drawing Sheets

(51) Int. Cl.
*H04L 43/026* (2022.01)
*G06F 12/0811* (2016.01)
*H04L 67/61* (2022.01)

(58) Field of Classification Search
USPC ........ 709/223, 203, 212; 711/103, 158, 165; 370/235.1
See application file for complete search history.

(56) References Cited

U.S. PATENT DOCUMENTS

| | | | | |
|---|---|---|---|---|
| 2008/0021925 | A1* | 1/2008 | Sweeney | G06F 16/84 |
| 2011/0072245 | A1* | 3/2011 | Duluk, Jr. | G06F 9/461 712/220 |
| 2012/0079175 | A1* | 3/2012 | Flynn | G11C 7/1012 711/103 |
| 2013/0185729 | A1* | 7/2013 | Vasic | G06F 9/5072 718/104 |
| 2013/0282994 | A1* | 10/2013 | Wires | G06F 9/45558 711/158 |
| 2014/0229698 | A1* | 8/2014 | Sivasubramanian | G06Q 10/06 711/165 |
| 2014/0280499 | A1* | 9/2014 | Basavaiah | G06F 9/45558 709/203 |
| 2016/0026604 | A1* | 1/2016 | Pandit | G06F 15/17331 709/212 |
| 2017/0364973 | A1* | 12/2017 | Van Biljon | H04L 67/32 |
| 2018/0349178 | A1* | 12/2018 | Painter | G06F 9/546 |
| 2020/0076892 | A1* | 3/2020 | Surcouf | H04L 67/1097 |
| 2020/0311054 | A1* | 10/2020 | Hicks | G06F 12/00 |

OTHER PUBLICATIONS

"Amazon Simple Workflow Service", Retrieved from: https://docs.aws.amazon.com/amazonswf/latest/developerguide/swf-dg.pdf, Jan. 25, 2012, 155 Pages.

"Azure status history", Retrieved from: https://status.azure.com/en-us/status/history/, May 2020, 13 Pages.

"Configure Sticky Sessions for Your Classic Load Balancer", Retrieved from: https://web.archive.org/web/20200508233525/https:/docs.aws.amazon.com/elasticloadbalancing/latest/classic/elb-sticky-sessions.html, May 8, 2020, 7 Pages.

"Deployment Topology", https://cadenceworkflow.io/docs/03_concepts/06_topology, Retrieved Date: May 22, 2020, 6 Pages.

"Google Cloud Status Dashboard", Retrieved from: https://status.cloud.google.com/incident/cloud-networking/18013, Aug. 7, 2019, 4 Pages.

"How Elastic Load Balancing Works", Retrieved from: https://docs.aws.amazon.com/elasticloadbalancing/latest/userguide/how-elastic-load-balancing-works.html, May 21, 2020, 30 Pages.

"Why is the Azure Load Balancer not working?", Retrieved from: https://lucian.blog/why-is-the-azure-load-balancer-not-working/, Jul. 12, 2018, 1 Pages.

Beckett, et al., "A general approach to network configuration verification", In Proceedings of the Conference of the ACM Special Interest Group on Data Communication, Aug. 7, 2017, pp. 155-168.

Dantoni, et al., "The power of symbolic automata and transducers", In Proceedings of 29th International Conference on Computer Aided Verification, Jul. 24, 2017, 20 Pages.

Eisenbud, et al., "Maglev: A fast and reliable software network load balancer", In Proceedings of 13th USENIX Symposium on Networked Systems Design and Implementation, Mar. 16, 2016, 523-535.

Fayaz, et al., "Efficient network reachability analysis using a succinct control plane representation", In Proceedings of 12th USENIX Symposium on Operating Systems Design and Implementation, Nov. 2, 2016, pp. 217-232.

Govindan, et al., "Evolve or die: High availability design principles drawn from googles network infrastructure", In Proceedings of the ACM SIGCOMM Conference, Aug. 22, 2016, pp. 58-72.

Nelson, et al., "Switches are monitors too! stateful property monitoring as a switch design criterion", In Proceedings of the 15th ACM Workshop on Hot Topics in Networks, Nov. 9, 2016, pp. 99-105.

Patel, et al., "Ananta: Cloud scale load balancing", In Proceedings of the ACM SIGCOMM Conference on SIGCOMM, Aug. 27, 2013, pp. 207-218.

Zhang et al., "Automated verification of customizable middlebox properties with gravel", In Proceedings of 17th USENIX Symposium on Networked Systems Design and Implementation (NSDI 20), Feb. 25, 2020, pp. 221-239.

"International Search Report and Written Opinion Issued in PCT Application No. PCT/US21/025694", dated Jul. 5, 2021, 13 Pages.

* cited by examiner

DISTRIBUTED FLOW PROCESSING AND FLOW CACHE

RELATED PRIORITY APPLICATIONS

The present application is a non-provisional application of, and claims priority to, the earlier filed U.S. Provisional Application Ser. No. 63/012,018 filed on Apr. 17, 2020, the contents of the listed applications are hereby incorporated by reference in their entirety.

BACKGROUND

A "flow" is a set of network packets that share a common property, such as a flow's endpoint. For example, one type of flow is a "5-tuple," with all packets moving in one direction and having the same source, destination IP addresses, and port numbers. Some systems offer the capability of monitoring these flows for analysis and to improve a system's efficiency. Network flow monitoring and processing are often the best ways to improve intermittent network performance and ensure Quality of Service (QoS) for applications and services.

A flow cache is a mapping from flow keys defining a set of actions/transformations to be executed on each packet that matches the flow key. The idea is to execute a slow flow allocation operation, such as a NAT allocation, once with a new flow and then cache the actions and transformations so in each subsequent packet of the flow, the slow operation is not executed. With high performance packet processing frameworks, such as Data Plane Development Kit (DPDK), a system can implement a flow processor that can scale to 3 million packets per second (PPS) or 10 million simultaneous flows. However, these are not enough for large-scale cloud systems. A cloud scale flow cache needs to support the following requirements, such as (1) high levels of reliability and seamless failover, e.g., flow processing is not disturbed during a failover, (2) Scalability, e.g., process 100 million flows, (3) billing and distributed denial-of-service (DDOS) reporting, e.g., the generation of granular flow statistics of transferred packets are required for accurate billing and DDOS policy generation, and (4) hardware offload capabilities: basic flow actions, e.g., data encapsulation, data decapsulation, and rewrite source actions, can be offloaded to network applications, such as a Tor.

Flow replications are needed so that when a worker goes offline (crash, update, etc.), the flows allocated from the worker can be picked up by other workers without interrupting customer traffic. However, flow replication is a costly operation. For example, when a worker comes online, the worker needs to transfer the full flow table, which will consume bandwidth from customer traffic. In another example, flow changes or updates need to be replicated across workers as well. This requirement can generate high packet rates consuming both bandwidth and processing power of the workers. In one illustrative example, a flow table of 100 million flows with 400 bytes to store a flow, the workers would require 40 GB of memory to store the flow table. This also means, when a worker restarts, a system is required to transfer all of this data. Workers can typically process 3 million PPS. For flow replication, a system would need to send a packet each time a flow's state changes, i.e., moves from half open to open, from open to half close. A system would also need to send regular updates about the flow, so workers do not expire the flows. If it is assumed that a worker receives 100K new flows per sec and 100K of flows end (fins), replication of this traffic to another worker would generate 200K PPS. If a NAT gateway consists of 7 workers, then the total PPS a worker may receive could be 1.4 million PPS, which could utilize nearly half of the processing capabilities of today's worker designs. Given these scenarios, providing scalable and reliable flow cache by replicating the flows across all workers for a NAT gateway is costly, and in some cases, ineffective.

SUMMARY

The techniques disclosed herein improve the efficiency, reliability, and scalability of flow processing systems by providing a multi-tier flow cache structure that can reduce the size of a flow table and also reduce replicated flow sets. In some configurations, a system can partition a flow space across workers and replicate the flows within a partition to a small set of workers. In some configurations, a flow cache structure can include three tiers that includes a flow processing layer, a flow state management layer, and a flow decider layer. The flow processing layer can include packet workers that can execute the actions and transformations on a flow. The flow processing layer can be configured to scale to accommodate a system's throughput. The flow state management layer can include workers that manage distributed flow state decisions for packets of a flow. The flow decider layer can identify actions and transformations needs to be executed on each packet of a flow.

In some configurations, a flow processing system partitions a flow space across a number of packet workers. Each worker can include independent hardware units, e.g., device nodes. Thus, flow state data, e.g., transformations, is replicated across multiple computing device nodes. The replication can be configured to allow a computing device node to be taken offline without impacting the flow. The replication is also conducted in a way that reduces the amount of data that is transferred between device nodes while improving the scalability and reliability of a flow processing system.

In some configurations, a flow processing system can replicate the flows within a partition to a predetermined set of workers. In a partitioning process, an individual worker is selected as a primary worker, which forms as a start of a chain of other workers. The flow state data is then associated with the entire chain. Any worker can be selected as a primary worker, which enables a system to offer a decentralized daisy chain structure. This design improves the efficiency, scalability and reliability of a flow processing system.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein improve the efficiency, reliability and scalability of flow processing systems by providing a multi-tier flow cache structure that can reduce the size of a flow table and also reduce replicated flow sets. In some configurations, a system can partition a flow space across workers and replicate the flows within a partition to a small set of workers, e.g., 2 or 3 workers. For illustrative purposes, consider a scenario where a system parameter defines an initial performance metric of 100 million flows. In this scenario, a system can partition 100 million flows into 3 partition. Thus, in each partition, the system needs to manage 33 million flows. In addition, each worker receives 500K PPS, which can include flow updates and flow state change messages. In this example scenario, this workload constitutes 16% of the workers capacity. To facilitate partitioning, a system can divide a flow hash space into 256 buckets.

Figure 1:
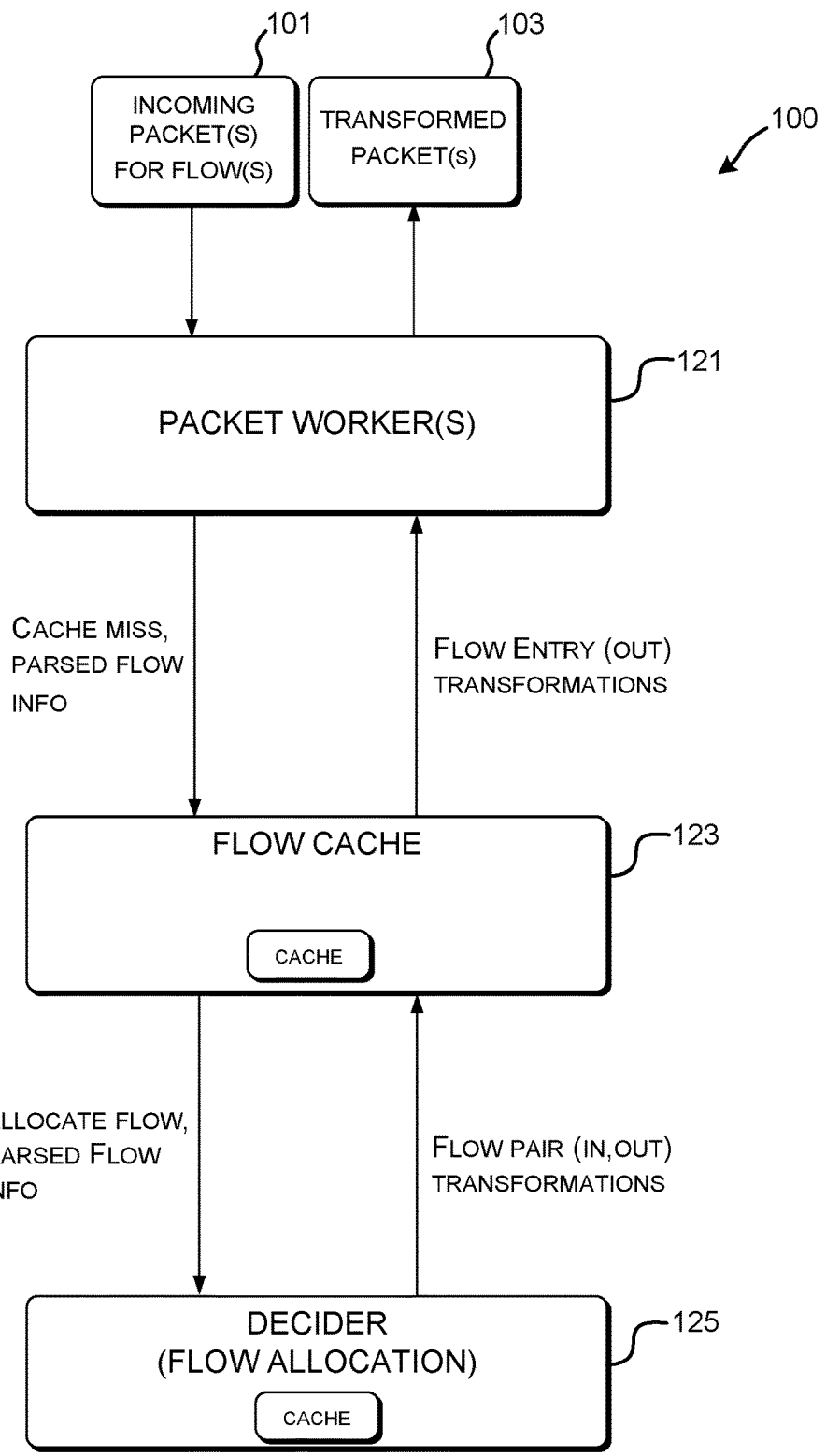
FIG. 1 is a block diagram of a three-tier flow cache structure including a scalable flow processing layer, a flow state management layer and a flow decider layer.
Figure 2:
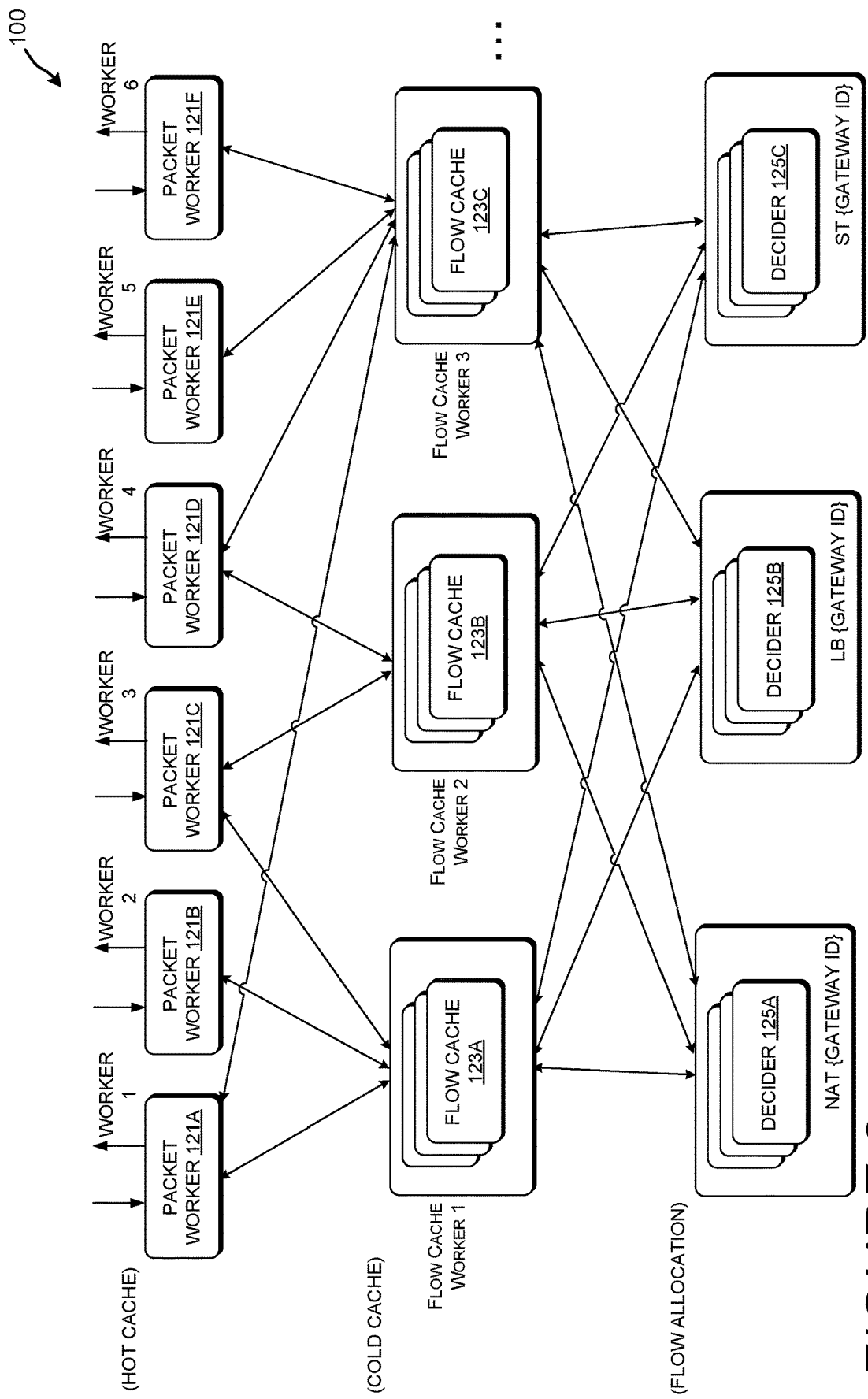
FIG. 2 is a block diagram of an expanded view of the three-tier flow cache structure including workers of a scalable flow processing layer, workers of a flow state management layer and partitions of a flow decider layer.
Figure 3:
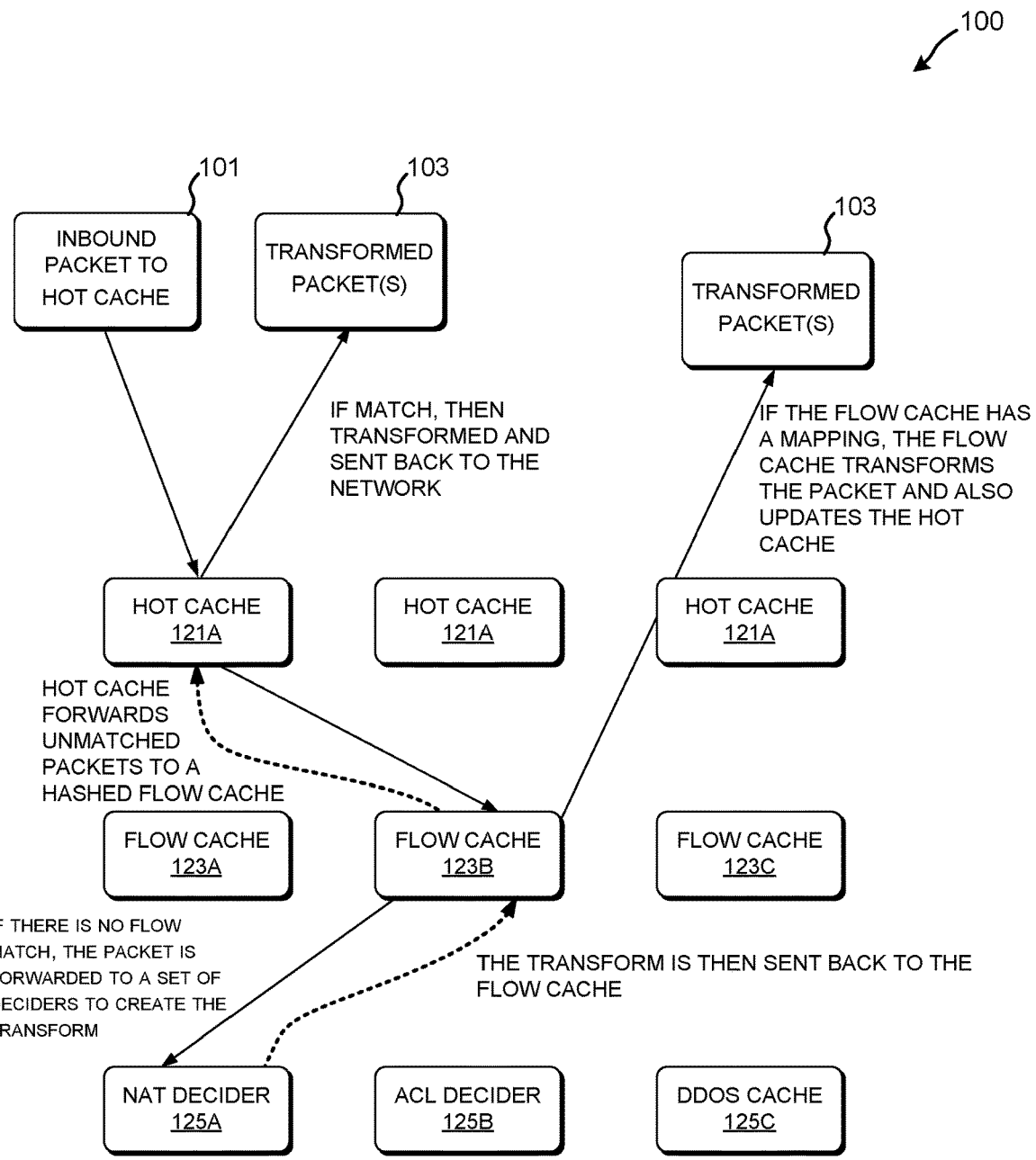
FIG. 3 is a block diagram of an expanded view of the three-tier flow cache structure showing the processing of packets of a flow between the layers of the structure.
Figure 4:
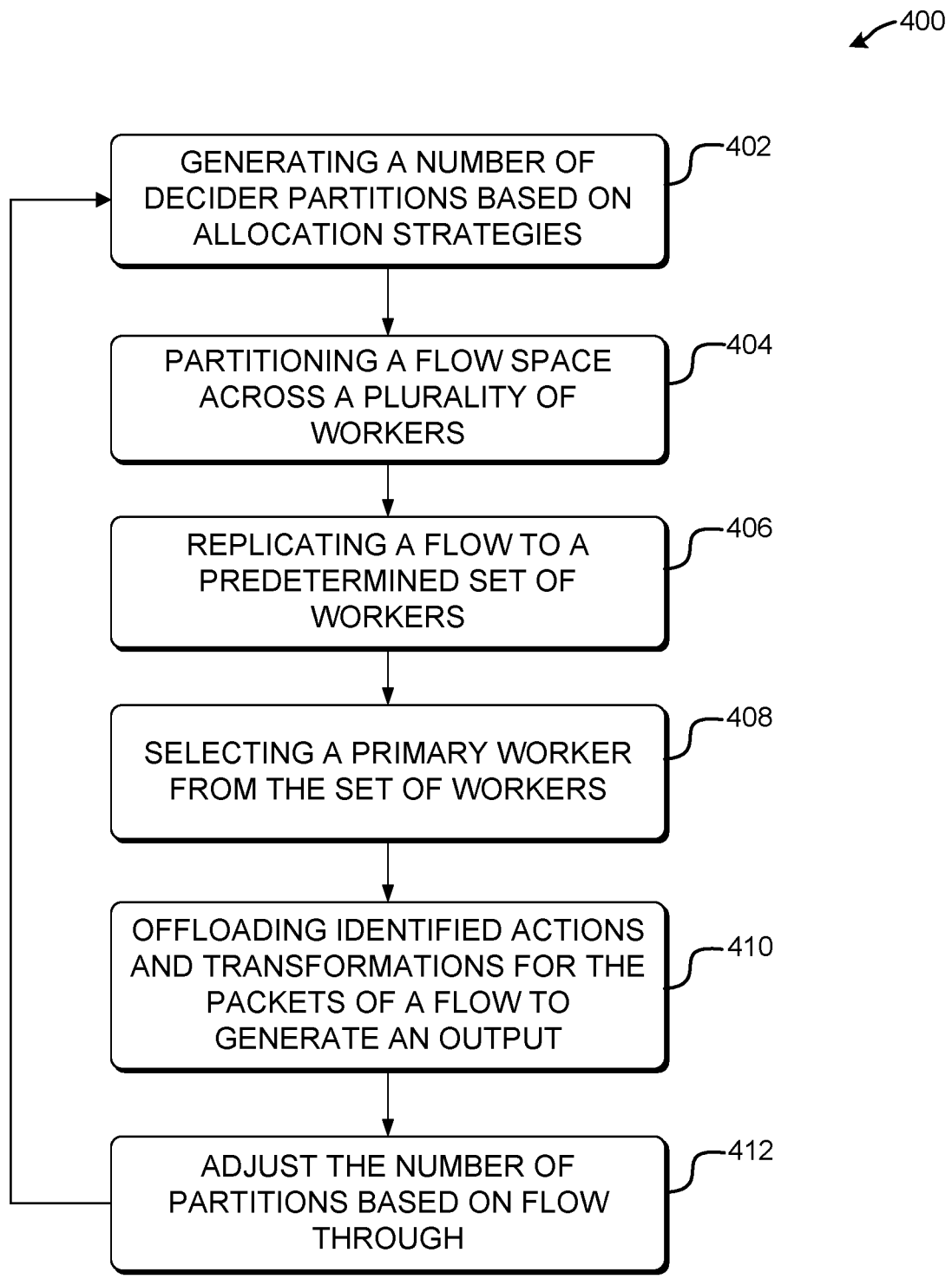
FIG. 4 is a flow diagram showing aspects of a routine for processing a flow using a three-tier flow cache structure.

To address the above-described requirements, the techniques disclosed herein provide a multi-tier flow cache structure. FIG. 1 and FIG. 2 illustrate example embodiments of a flow cache structure 100 having three tiers: a processing layer having packet workers 121 (hot cache), a flow state management layer comprising flow cache partitions 123 (cold cache), and a flow decider layer having decider partitions 125 (flow allocation). The packet workers 121 are stateless and maintain a subset of the flow cache that consists of active flows, which in the current example, could be 1 million flows. The packet workers 121 can perform operations as follows: incoming packets 101 are parsed and a context is extracted. A context can include attributes such as the protocol numbers, offsets, etc. If packet is not encapsulated, then a 5-tuple is searched in the flow cache, e.g., a flow cache partition 123. For illustrative purposes, an encapsulated packet, e.g., an "encaped" packet, can be associated with a tunneling mechanism, such as, Generic Routing Encapsulation (GRE) and IP-in-IP (IPIP). If the packet is encapsulated or not found in the flow cache then a processing function is looked up. The processing function, in turn, can parse an inner packet and extract the 5-tuple and search for the 5-tuple in the flow cache. In response to a cache hit, the cached flow transformations are executed, and the packet is sent out as an output.

In response to a cache miss, the packet worker 121 identifies the partition of the related flow and sends it to the flow cache 123. In this scenario, the original packet will be encaped, e.g., the User Datagram Protocol (UDP) destination IP is the flow cache destination IP and port is predefined port. In some configurations, the system can pad the flow key to the packet. A cache hit is a state in which data requested for processing by a component is found in the cache memory. Such techniques offer a faster means of delivering data to a processor, as the cache already contains the requested data.

In the example of FIG. 2, a physical flow cache partition, also referred to herein as the "flow cache 123," consists of three workers and each worker is responsible for a set of buckets, which can be dynamically assigned. When a packet from packet worker arrives, the flow cache 123 will execute the following: first, an individual flow cache 123 will use a flow key to lookup the flow in its own cache (depicted in FIG. 1 within the flow cache 123). In response to a cache hit, the flow transformations will be sent to the worker. The cache will also execute the transformations and send the packet out, which is referred to herein as a transformed packet 103.

In response to a cache miss, i.e., the system has not received this particular flow before, the flow cache will execute a lookup on the original packet. The lookup operation will return data from the flow decider 125. The flow cache 123 then forwards the packet. For example, a destination IP 137.89.89.12 send to NAT allocation flow decider partition 5 (partitioned based on VIP) or destination IP 10.12.12.1 UDP port 1000 extract gateway ID and send to NAT flow decider partition 5. Upon receiving a packet from the flow decider 125, the flow cache 123 will add it to the cache and replicate it across the workers in the same partition.

The flow decider 125 implements flow allocation strategies, such as LB, NAT, ACL, etc. The allocation strategies are partitioned according to the functionality. For instance, NAT deciders will be partitioned according to a gateway ID. Upon receiving a packet from the flow cache, the decider 125 will check its own cache and if the there is a cache hit, it will send the flow with transformations back to the flow cache 123. In response to a cache miss, the decider 125 will execute the flow allocation, and form the transformations that are going to be executed on each packet of the flow. Flow decider 125 is partitioned according to the flow strategies. Thus, if there are three strategies, there are three partitions, if there are four strategies, there are four partitions, etc.

The flow cache 123 will be responsible for a set of buckets. In some configurations, a forwarder, such as an L3 forwarder, will be implemented and will determine which bucket the flow belongs to, and forward the packets to, the workers responsible from that partition. Similar to one partition case shown above, the packet worker will forward the packet to cold cache if there is a cache miss. Similar to the flow cache, the flow decider state will be replicated across the workers of the partition.

The example of FIG. 2 shows an illustrative example involving a NAT Gateway with 9 workers and 3 partitions.

The assignment of buckets to physical partitions workers will be realized by a control. In one illustrative example, a system can aim for 30 million flows per partition and a partition size of 3 workers (hence, 20% of the capacity will be reserved for flow replication). The control will send 256 {bucket, ip worker 1, ip worker 2, ip worker 3} tuples to each worker. With 3 partitions, the system can aim for 99 million flows in a NAT gateway instance. Such configurations can allow buckets to be reassigned at runtime. Hence, the system can dynamically increase or reduce the partition count, allowing the system to manage more flows.

In one illustrative example, in one partitioning scheme, a flow space can be divided to 256 packets. A flow cache owns a set of partitions (256/7 on a seven-node ring, 256/14 on a 14 node ring, etc. Control plane programs which partitions are owned by each flow cache. For example: assume that worker 1 owns, partitions 1,2,3, and worker 2 owns 4,5,6. Then for worker 2 the partitioning scheme will be: {1,2,3} owner, {4,5,6} replica set.

The following is one example scheme that can be programmed to a flow cache:

TABLE 1

| |
| --- |
| Worker 1, replicas: worker 2, 3 |
| Worker 2, replicas: worker 3, 4 |
| Worker 3, replicas: worker 4, 5 |
| Worker 4, replicas: worker 5, 6 |
| Worker 5, replicas: worker 6, 7 |
| Worker 6, replicas: worker 7, 1 |
| Worker 7, replicas: worker 1, 2 |

The benefit of this scheme is that it makes updates to flow cache easy: one flow cache at any time can be taken down to perform code updates. This is an example and is not to be limiting, as there can be any number of workers.

The following description illustrates one example of a flow allocation involving a SYN packet, which are generated when a client attempts to start a connection with a server. First, a packet worker calculates a flow signature (hash on 5-tuple) and finds the partition ID of the flow (mod 256). The packet worker 121 then forwards SYN packet with a query message header to one of the active replicas of the partition. The replica k:n (where k is the partition ID and n is the replica ID) receiving the packet is considered the owner of the flow entry. This flow cache will handle the communication with the flow decider. As such, the replica will forward the packet to one of the flow deciders (currently local flow decider). The flow decider allocates the flow and send the add entry command k:n. Here, add entry command contains the set of transformations to be executed on each packet of the flow. Upon receiving the add entry message, k will determine the replica sets for each entry of the flow (a flow between a source and destination consists of two entries: OUT from the source to destination and IN from destination to source). Then k:n will forward the message to each replica by forming a spanning tree rooted at k:n. That is the add entry message traverses replicas m:1 . . . m:n, k:1 . . . k:n flow caches, where m is the partition id of the IN flow entry. The add entry message traversal always ends at the flow cache it has started, e.g., k:n. This way the algorithm ensures the transformations are replicated across all replicas.

The following description illustrates one example of a flow termination involving a TCP FIN/RST. Generally described, FIN is used to close TCP connections gracefully in each direction, while TCP RST is used in a scenario where TCP connections cannot recover from errors and the connection needs to reset forcibly. First, the packet worker will remove the entry from its cache and forward the FIN/RST packet to one of the replicas. The replica k:I (might be different from k:n), will send the FIN/RST packet out and then send out a SYNC message to the replica set of k. The SYNC message will traverse the replicas forming a spanning tree. Once each reaches k:n, k:n will forward the removal message to the replica set of m. A replica receiving this message will set the entry state to closed and starts the purge timer. The flow entries are not removed for the cache immediately to handle time-wait state of TCP.

The following description illustrates one example of an idle timeout. In some configurations, the idle timeout can only be started from the owner flow caches k:n. When the idle timer expires: (1) the flow cache k:n will send a remove entry message that traverses the replica sets k and m (similar to add entry message), and (2) the replica receiving the message will put the entry to CLOSED state and start the purge timer.

The following description illustrates one example of a Flow update. Flow updates are sent from packet processors to flow cache every. These updates are required for the flow cache to keep an update on the flow time out, and time out inactive flows. The flow update process will work as follow: (1) Depending on the probe information, a packet processor will decide on the active (alive) replica of a partition k and send the flow update message to that flow cache. (2) The flow cache k:i receiving the flow update message, will forward the message to the replica set k. The flow cache will forward the update message every 15 s or on flow state change.

The following description illustrates one example of a probing process for detecting failures. The aim of the probing in the data path is for managed NAT instances to discover an unresponsive instance within a short time, e.g., a second. Systems have probing from server load balancing (SLB) HP, but this probing is for deciding which packet workers (hot cache) instances are active. The probing in the data path, on the other, is useful when the hot cache is separated from the flow cache and the decider. The system can adapt a distributed algorithm in that each managed NAT instance will keep a list of active workers. Each worker will send an "alive" message every 100 ms (10 per second) using different source ports to each other worker. This way the packets will travel through different paths in the network. Each alive message will contain a monotonically increasing sequence number. Failure detection with probing is realized as follows: (1) If a worker I receives at least on alive message from worker j in a predetermined time, e.g., a second, then worker I decides that worker j is alive. (2) If worker I does not receive an update message from another worker, j, for the predetermined time, worker I can assume worker j is unhealthy and start talking to its replicas.

The following description illustrates one example of a Flow cache cold start. The flow cache will start listening to flow update messages. As it listens the update message, the flow cache will populate its own cache. Update messages for idle flows will be sent periodically, e.g., every 10 minutes, thus by listening the flow updates, the flow cache can rebuild its state. While doing this, the flow cache can determine timed out flows and start a teardown process.

The following description provides additional implementation details of the three-tier structure. In this example, a cloud system can utilize a scalable distributed network flow processing method using the three-tiered design that includes a flow decision (identifying what action and transformation need to be executed on each packet of a flow), distributed flow state management (allocation, deallocation, strong consistent reliable replication of flow state, etc.), and scalable flow processing layer (executing the action and transformation on a flow which scales horizontally with throughput).

In the flow decider layer, entities can run on low cost hardware executing specific network functions like access control processing, firewall, DDOS, NAT translations, application layer processing NFV. These network functions can be daisy chained realizing multiple transformation on a flow. Interfaces with flow state management functionality can maintain the life cycle of a flow.

In the flow state management layer (Flow Cache), the functionality is distributed, partitioned and consistent replication is applied across the layer for increased reliability, scalability and availability. A flow state (transformations) is replicated across multiple computing device nodes. Thus, a computing device node can be taken offline without impacting the flow. In partitioning a flow space across a plurality of computing device units, e.g., workers, replicating the flows within a partition to a predetermined set of workers involves a decentralized and efficient process where (1) a worker picked as the primary forms a chain of other workers where the flow state for a flow is daisy chain replicated. This de-centralizes the need for a permanent primary worker. There is no permanent primary worker, as each worker can be a primary worker for a flow. This layer can also involve synchronization of a flow state across the replicated workers allowing workers to learn about flow state upon cold start. Interfaces within flow processing layer can be used in a process for maintaining the life cycle of a flow.

In the scalable flow processing layer (Hot Cache), the flow processing can be offloaded to various stateless computing devices, e.g., a dedicated hardware box, cloud server, smart network cards, switches, etc. Each device can run in parallel providing scalability and reduced latency.

Figure 7:
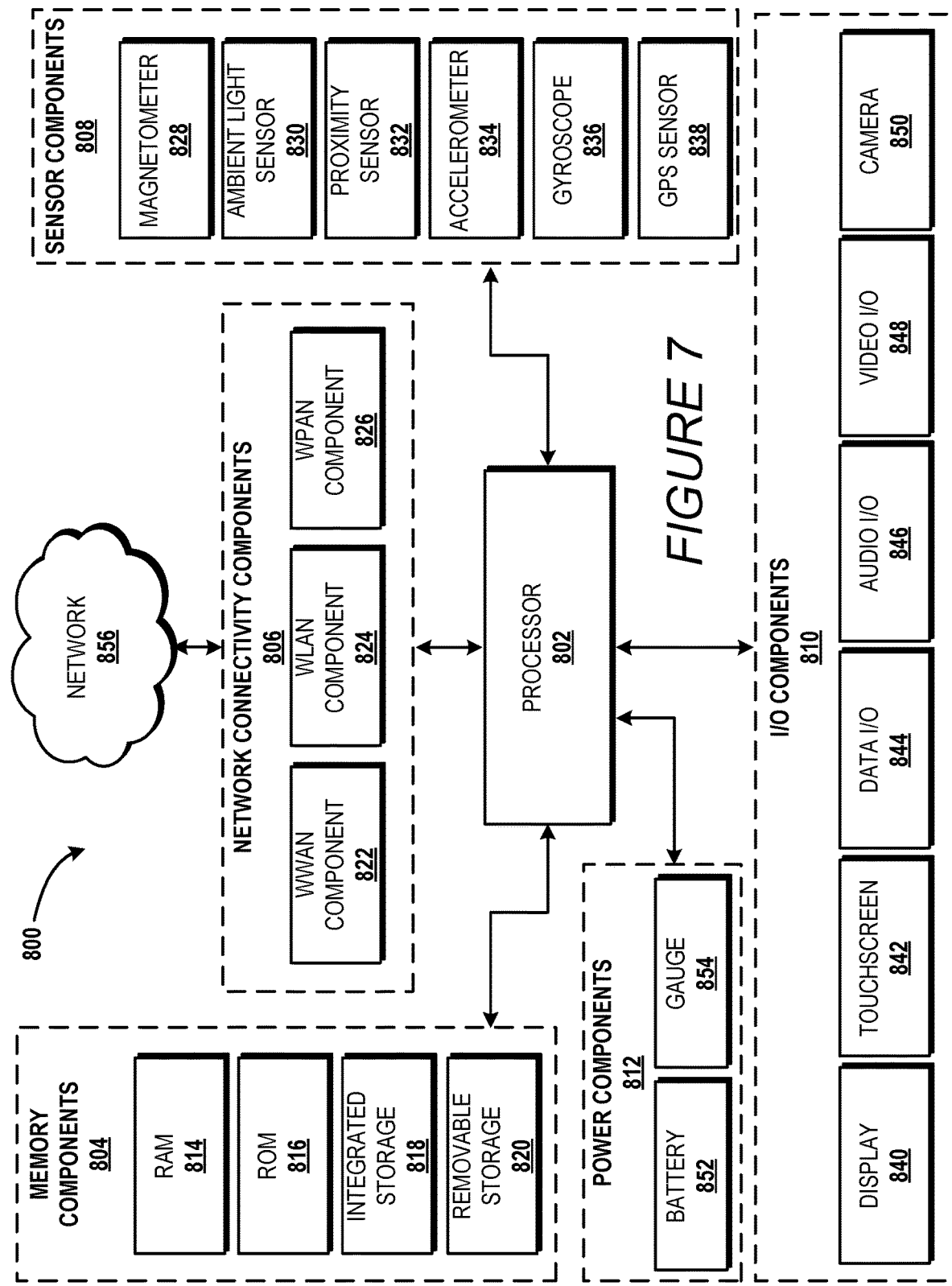
FIG. 7 is a computer architecture diagram illustrating a computing device architecture for a computing device capable of implementing aspects of the techniques and technologies presented herein.

Turning now to FIG. 7, an example routine 500 for processing a flow using a three-tier cache structure is shown and described below. These routines can be utilized separately or in combination in any order. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be rearranged, added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the example routines are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to a flow processing engine 623 for performing the techniques disclosed herein, also referred to herein as a "control." It can be appreciated that the operations of the example routines may be also implemented in many other ways. For example, the example routines may be implemented, at least in part, by a processor of another remote computer or a local computer. In addition, one or more of the operations of the example routines may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 7, a routine 400 for processing a flow using a multi-tier flow cache structure that can reduce the size of a flow table and also reduce replicated flow sets is shown and described. It can be understood that the routine 400 can operate using a structure flow cache structure (100) that separates categories of operations into multiple tiers. The flow cache structure (100) can include a first tier (125) for identifying actions and transformations to be executed for individual packets of a flow, a second tier (123) for managing distributed flow states replicated across multiple workers, and a scalable flow processing tier (121) for executing the identified actions and transformations on individual packets of the flow.

The routine begins at operation 402 where a flow processing engine 623 generates a number of decider partitions, at the first tier (125), wherein individual decider partitions are assigned individual flow allocation strategies for forming the actions and the transformations for execution. For example, the system will create a NAT deciders will be partitioned according to a Gateway ID if a NAT strategy is indicated in any input data. If input data indicates other strategies, another partition can be created for DDOS, another partition can be created for LB, another partition can be created for ACL, etc. Next, at operation 404, the flow processing engine 623 can partition, at the second tier (123), a flow space of the flow across a plurality of workers. Then, at operation 406, the flow processing engine 623 can replicate the flows within a partition to a small set of workers.

At operation 408, the flow processing engine 623 can selecting, at the second tier (123), a primary worker from the set of workers, the primary worker causing a start of a chain of other workers where a flow state for the flow is replicated to enable a decentralized daisy chain structure. The flow state can include data indicating the status of the packets of a flow and the primary worker can manage aspects of the other workers in the daisy chain. Daisy chaining is accomplished by connecting each computer in series to the next. If a message is intended for a computer partway down the line, each system bounces it along in sequence until it reaches the destination. A daisy-chained network can take two basic forms: linear and ring. A linear topology puts a two-way link between one computer and the next. Each computer, except for the ones at each end, are required to have two receivers and two transmitters. By connecting the computers at each end of the chain, a ring topology can be formed. When a node sends a message, the message is processed by each computer in the ring. An advantage of the ring is that the number of transmitters and receivers can be cut in half. Since a message will eventually loop all of the way around, transmission does not need to go both directions. Alternatively, the ring can be used to improve fault tolerance. If the ring breaks at a particular link then the transmission can be sent via the reverse path thereby ensuring that all nodes are always connected in the case of a single failure.

There is no predetermined primary worker, as each worker can be a primary worker for a flow. At operation 410, the flow processing engine 623 can offload the identified actions and transformations for the packets of the flow to one or more stateless workers for execution at the third tier (121) to generate an output comprising transformed packets (103) formed by the identified actions and transformations. At operation, 412, the flow processing engine 623 can adjust a number of partitions, either lower or raise the number of partitions, based on a level of traffic and/or based on how buckets are reassigned at runtime. After operation 412, the routine 400 can return to operation 402 and continues to execute all or various operations of the routine 400.

In some configurations, a system 600 can include one or more processing units 602; and a computer-readable storage medium 604 having encoded thereon a flow cache structure 100 that separates categories of operations into multiple tiers, the flow cache structure 100 comprising a first tier 125, a second tier 123, and a scalable flow processing tier 121, wherein the first tier 125 identifies actions and transformations to be executed for individual packets 101 of a flow, the second tier 123 for managing distributed flow states replicated across multiple packet workers, and the scalable flow processing tier 121 for executing the identified actions and transformations on individual packets of the flow, the computer-executable instructions to cause the one or more processing units 602 to: generate a number of decider partitions, at the first tier 125, wherein individual decider partitions are assigned individual flow allocation strategies for forming the actions and the transformations for execution; partition, at the second tier 123, a flow space of the flow across a plurality of workers; replicate the flow to a predetermined set of workers of the plurality of workers at the second tier 123, wherein the set of workers at the second tier 123 are configured to manage distributed flow state decisions for packets of the flow; select, at the second tier 123, a primary worker from the set of workers, the primary worker causing a start of a chain of other workers where a flow state for the flow is replicated to enable a decentralized daisy chain structure; and offload the identified actions and transformations for the packets of the flow to one or more stateless workers for execution at the third tier 121 to generate an output comprising transformed packets 103 formed by the identified actions and transformations.

The system can include a worker of the predetermined set of workers at the second tier performs a lookup in a cache associated with the second tier using a flow key associated with an incoming packet, and cause an execution of one or more transformations for the packet and sending the packet as part of the output in response to a cache hit from the lookup.

The system can include a worker of the predetermined set of workers at the second tier performs a lookup in a cache associated with the second tier using a flow key associated with an incoming packet, and in response to a cache miss from the lookup, causing a second lookup using an original packet causing a decider from a decider partition to produce a processed packet which is added to the cache associated with the second tier and sending the processed packet as part of the output.

The system can also include instructions further causing the one or more processing units to: in response to receiving a packet of the flow at a decider partition at the first tier from a worker at the second tier, determine if a cache of the decider partition at the first tier contains data identifying the packet; and if the cache of the decider partition at the first tier contains the data identifying the packet, causing the decider partition to send the flow with transformations back to the worker at the second tier.

The system can also include instructions further causing the one or more processing units to: in response to receiving a packet of the flow at a decider partition at the first tier from a worker at the second tier, determine if a cache of the decider partition at the first tier contains data identifying the packet; and if the cache of the decider partition at the first tier does not contain the data identifying the packet, causing the decider partition to execute a flow allocation and form one or more transformations to be executed by a stateless worker at the third tier.

The system can also include instructions for adjusting the partition count based on reassignment of buckets during runtime. For instance, the instructions can further cause the one or more processing units to: assign buckets associated with the flow to the predetermined set of workers; and adjust a partition count based on a number of packets associated with the buckets, wherein the partition count defines a number of workers of the plurality of workers.

The system can also include instructions partitioning scheme enabling the benefit of being able to take a flow cache down. For instance, the system can also include instructions that further cause the one or more processing units to: dividing a number of packets of the flow space into a predetermined number of packets for each partition at the second the second tier; assigning an individual partition to an individual worker as an owner of the individual group of partitions; and replicating at least one of the partitions owned by the individual worker across another worker for allowing the operations to be applied to the at least one of the partitions while the individual worker is taken out of operation.

Some embodiments can include a non-transitory computer-readable storage medium 604 having encoded thereon a flow cache structure 100 that separates categories of operations into multiple tiers, the flow cache structure 100 comprising a first tier 125 for identifying actions and transformations to be executed for individual packets of a flow, a second tier 123 for managing distributed flow states replicated across multiple workers, and a scalable flow processing tier 121 for executing the identified actions and transformations on individual packets of the flow, the non-transitory computer-readable storage medium comprising computer-executable instructions to cause the one or more processing units 602 of a system 600 to: generate a number of decider partitions, at the first tier 125, wherein individual decider partitions are assigned individual flow allocation strategies for forming the actions and the transformations for execution; partition, at the second tier 123, a flow space of the flow across a plurality of workers; replicate the flow to the plurality of workers at the second tier 123, wherein the plurality of workers at the second tier 123 are configured to manage distributed flow state decisions for packets of the flow; select, at the second tier 123, a primary worker from the plurality of workers, the primary worker causing a start of a chain of other workers where a flow state for the flow is replicated to enable a decentralized daisy chain structure; and offload the identified actions and transformations for the packets of the flow to one or more stateless workers for execution at the third tier 121 to generate an output comprising transformed packets 103 formed by the identified actions and transformations.

The non-transitory computer-readable storage medium can also cause the system to include a worker of the plurality of workers at the second tier performs a lookup in a cache associated with the second tier using a flow key associated with an incoming packet, and cause an execution of one or more transformations for the packet and sending the packet as part of the output in response to a cache hit from the lookup.

The non-transitory computer-readable storage medium can also cause the system to include a worker of the plurality of workers at the second tier performs a lookup in a cache associated with the second tier using a flow key associated with an incoming packet, and in response to a cache miss from the lookup, causing a second lookup using an original packet causing a decider from a decider partition to produce a processed packet which is added to the cache associated with the second tier and sending the processed packet as part of the output.

The non-transitory computer-readable storage medium can also include instructions further causing the one or more processing units to: in response to receiving a packet of the flow at a decider partition at the first tier from a worker at the second tier, determining if a cache of the decider partition at the first tier contains data identifying the packet; and if the cache of the decider partition at the first tier contains the data identifying the packet, causing the decider partition to send the flow with transformations back to the worker at the second tier.

The non-transitory computer-readable storage medium can also include instructions further causing the one or more processing units to: in response to receiving a packet of the flow at a decider partition at the first tier from a worker at the second tier, determining if a cache of the decider partition at the first tier contains data identifying the packet; if the cache of the decider partition at the first tier does not contain the data identifying the packet, causing the decider partition to execute a flow allocation and form one or more transformations to be executed by a stateless worker at the third tier.

The non-transitory computer-readable storage medium can also include instructions further causing the one or more processing units to: assign buckets associated with the flow to the plurality of workers; and adjust a partition count based on a number of packets associated with the buckets, wherein the partition count defines a number of workers of the plurality of workers.

The non-transitory computer-readable storage medium can also include instructions further causing the one or more processing units to: dividing a number of packets of the flow space into a predetermined number of packets for each partition at the second the second tier; assigning an individual partition to an individual worker as an owner of an individual group of partitions; and replicating at least one of the partitions owned by the individual worker across another worker for allowing the operations to be applied to the at least one of the partitions while the individual worker is taken out of operation.

Some configurations can also include a computer-implemented method for improving reliability and scalability of a flow processing system 600, the computer-implemented method comprises: obtaining data defining a flow cache structure 100 that separates categories of operations into multiple tiers, the flow cache structure 100 comprising a first tier 125 for identifying actions and transformations to be executed for individual packets of a flow, a second tier 123 for managing distributed flow states replicated across multiple workers, and a scalable flow processing tier 121 for executing the identified actions and transformations on individual packets of the flow; generating a number of decider partitions, at the first tier 125, wherein individual decider partitions are assigned individual flow allocation strategies for forming the actions and the transformations for execution; partitioning, at the second tier 123, a flow space of the flow across a plurality of workers; replicating the flow to a set of workers of the plurality of workers at the second tier 123, wherein the set of workers at the second tier 123 are configured to manage distributed flow state decisions for packets of the flow; selecting, at the second tier 123, a primary worker from the set of workers, the primary worker causing a start of a chain of other workers where a flow state for the flow is replicated to enable a decentralized daisy chain structure; and offloading the identified actions and transformations for the packets of the flow to one or more stateless workers for execution at the third tier 121 to generate an output comprising transformed packets 103 formed by the identified actions and transformations.

The computer-implemented method can also include a worker of the predetermined set of workers at the second tier performs a lookup in a cache associated with the second tier using a flow key associated with an incoming packet, and cause an execution of one or more transformations for the packet and sending the packet as part of the output in response to a cache hit from the lookup.

The computer-implemented method can also include a worker of the predetermined set of workers at the second tier performs a lookup in a cache associated with the second tier using a flow key associated with an incoming packet, and in response to a cache miss from the lookup, causing a second lookup using an original packet causing a decider from a decider partition to produce a processed packet which is added to the cache associated with the second tier and sending the processed packet as part of the output.

The computer-implemented method can also comprise in response to receiving a packet of the flow at a decider partition at the first tier from a worker at the second tier, determining if a cache of the decider partition at the first tier contains data identifying the packet; and if the cache of the decider partition at the first tier contains the data identifying the packet, causing the decider partition to send the flow with transformations back to the worker at the second tier.

The computer-implemented method can also comprise in response to receiving a packet of the flow at a decider partition at the first tier from a worker at the second tier, determining if a cache of the decider partition at the first tier contains data identifying the packet; if the cache of the decider partition at the first tier does not contain the data identifying the packet, causing the decider partition to execute a flow allocation and form one or more transformations to be executed by a stateless worker at the third tier.

The computer-implemented method can also comprise assigning buckets associated with the flow to the predetermined set of workers; and adjusting a partition count based on a number of packets associated with the buckets, wherein the partition count defines a number of workers of the plurality of workers.

Figure 5:
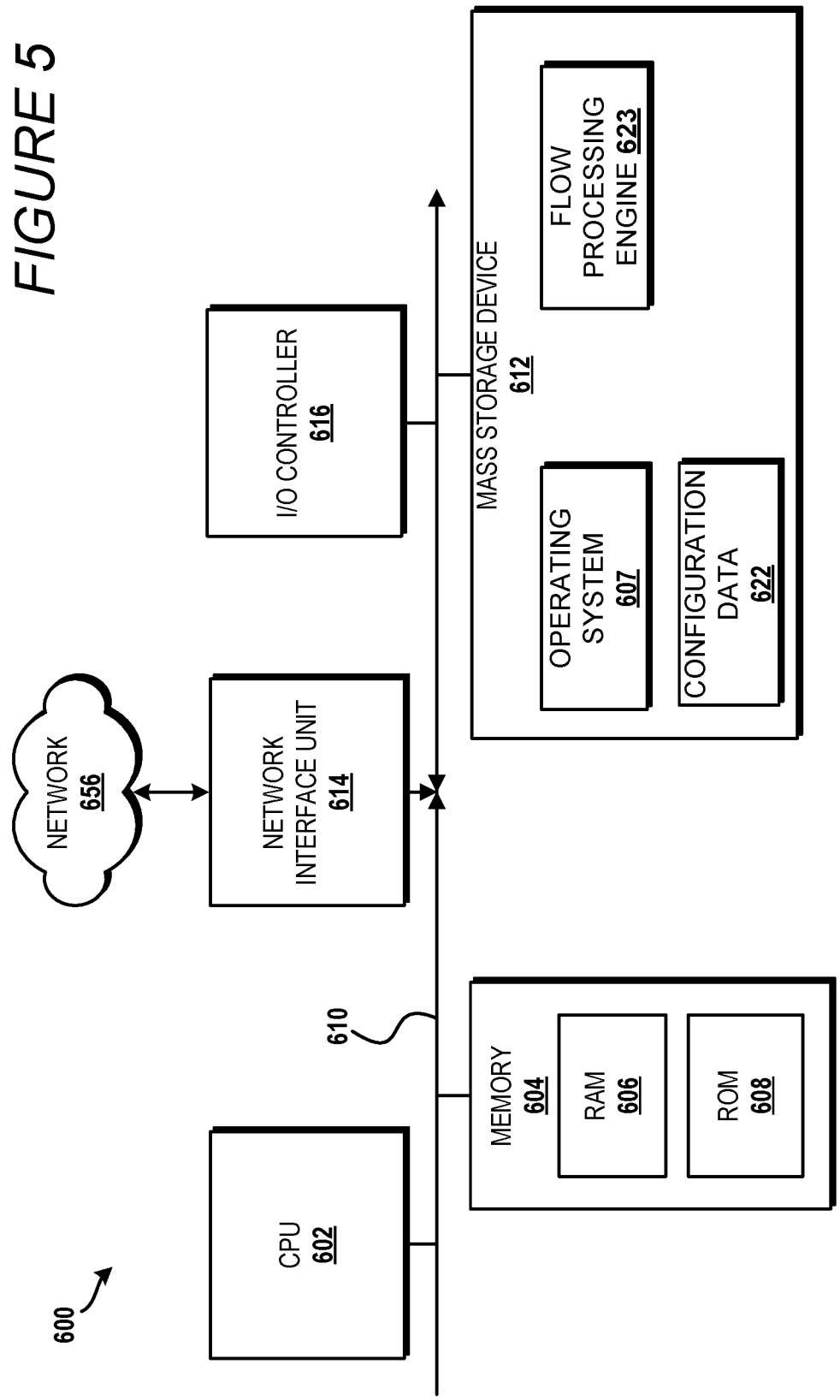
FIG. 5 is a computer architecture diagram illustrating an illustrative computer hardware and software architecture for a computing system capable of implementing aspects of the techniques and technologies presented herein.

FIG. 5 shows additional details of an example computer architecture 600 for a computer, such as the computing device 101 of the other figures, capable of executing the program components described herein. Thus, the computer architecture 600 illustrated in FIG. 5 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 5 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, such as the configuration data 622, and one or more applications, such as the flow processing engine 623 that can perform the techniques disclosed herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" or a "non-transitory computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 5). Similarly, the input/output controller 616 may provide output to a display screen, a printer, or other type of output device (also not shown in FIG. 5).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 5, may include other components that are not explicitly shown in FIG. 5, or may utilize an architecture completely different than that shown in FIG. 5.

Figure 6:
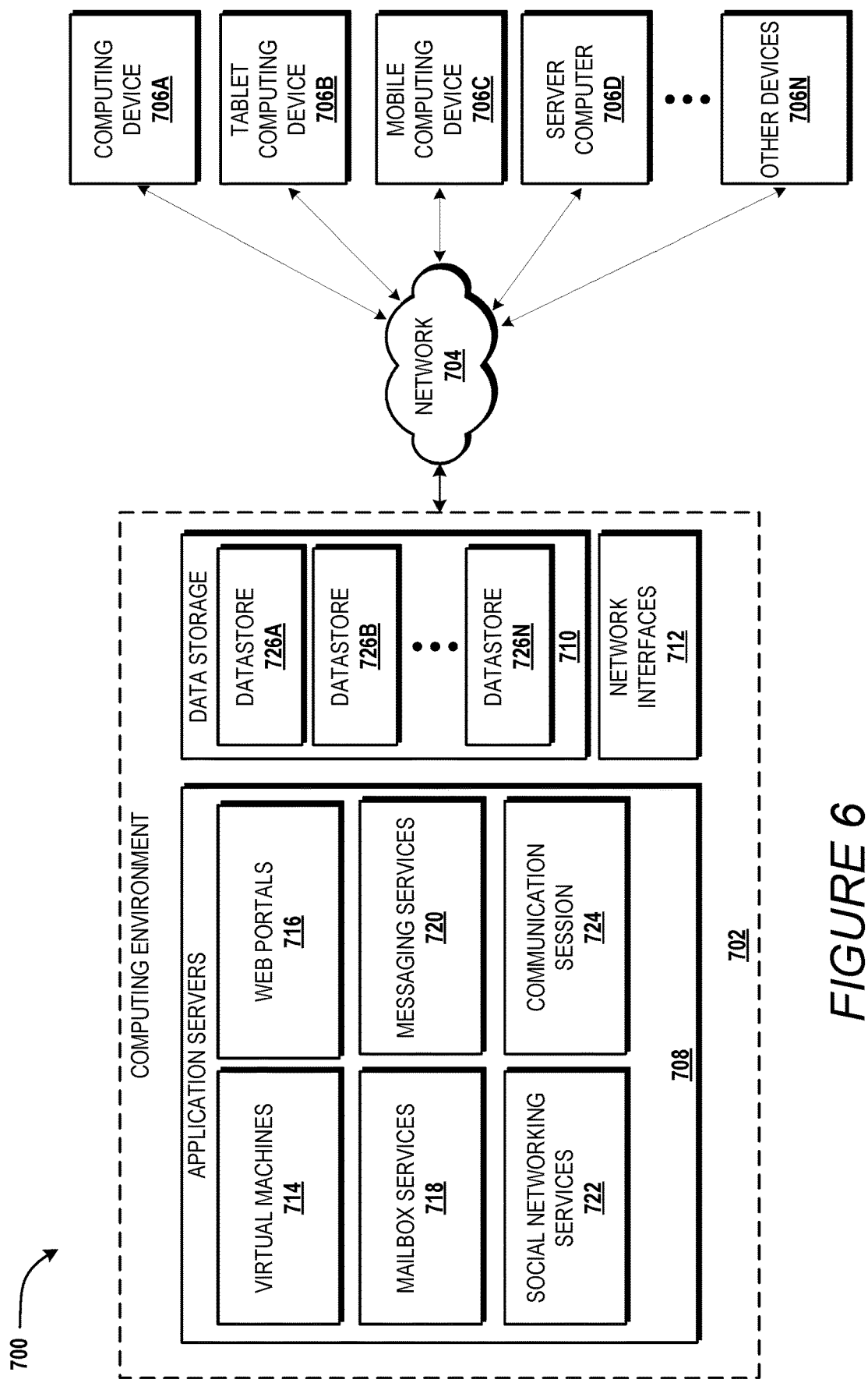
FIG. 6 is a diagram illustrating a distributed computing environment capable of implementing aspects of the techniques and technologies presented herein.

FIG. 6 depicts an illustrative distributed computing environment 700 capable of executing the software components described herein. Thus, the distributed computing environment 700 illustrated in FIG. 6 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 5. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 6). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling efficient testing disclosed herein. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, LINKEDIN professional networking service, GOOGLE HANGOUTS networking service, SLACK networking service, YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 6. Any device or service depicted herein can be used as a resource for supplemental data, including email servers, storage servers, etc.

As shown in FIG. 6, the application servers 708 also can host other services, applications, portals, and/or other resources ("other resources") such as a service managing a communication session 724. The communication session 724 can include, but is not limited to, document sharing, text sharing, video sharing, etc. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 6, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 6.

Turning now to FIG. 7, an illustrative computing device architecture 800 for a computing device that is capable of executing various software components described herein for enabling the techniques disclosed herein. The computing device architecture 800, also referred to as a computer 101 or computing device 101, is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in the figures. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 7 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 10, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 14. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based buttons.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A system, comprising:
one or more processing units; and
a non-transitory computer-readable storage medium having encoded thereon a flow cache structure that separates categories of operations into multiple tiers, the flow cache structure comprising a first tier, a second tier, and a scalable flow processing tier, wherein the first tier identifies actions and transformations to be executed for individual packets of a flow, the second tier for managing distributed flow states replicated across multiple packet workers, and the scalable flow processing tier for executing the identified actions and transformations on individual packets of the flow, the computer-executable instructions to cause the one or more processing units to:
generate, at the first tier, a number of decider partitions based on a number of flow allocation strategies utilized by the flow cache structure for forming the actions and the transformations for individual packets of the flow, wherein individual decider partitions are assigned individual flow allocation strategies for forming the actions and the transformations;
partition, at the second tier, a flow space of the flow across a plurality of workers;
replicate the flow to a predetermined set of workers of the plurality of workers at the second tier, wherein the set of workers at the second tier are configured to manage distributed flow state decisions for packets of the flow;
select, at the second tier, a worker from the set of workers, the selected worker causing a start of a chain of other workers where a flow state for the flow is replicated to enable a decentralized daisy chain structure, the replication of the flow state enables each worker of the decentralized daisy chain structure to perform functionality of the selected worker in response to a failure of the selected worker; and
offload, using the number of flow allocation strategies in the number of decider partitions of the first tier, the identified actions and transformations for the packets of the flow to one or more stateless workers for execution at the scalable flow processing tier to generate an output comprising transformed packets formed by the identified actions and transformations.

2. The system of claim 1, wherein a worker of the predetermined set of workers at the second tier performs a lookup in a cache associated with the second tier using a flow key associated with an incoming packet, and cause an execution of one or more transformations for the packet and sending the packet as part of the output in response to a cache hit from the lookup.

3. The system of claim 1, wherein a worker of the predetermined set of workers at the second tier performs a lookup in a cache associated with the second tier using a flow key associated with an incoming packet, and in response to a cache miss from the lookup, causing a second lookup using an original packet causing a decider from a decider partition to produce a processed packet which is added to the cache associated with the second tier and sending the processed packet as part of the output.

4. The system of claim 1, wherein the instructions further cause the one or more processing units to:
in response to receiving a packet of the flow at a decider partition at the first tier from a worker at the second tier, determine if a cache of the decider partition at the first tier contains data identifying the packet; and
if the cache of the decider partition at the first tier does not contain the data identifying the packet, causing the decider partition to execute a flow allocation and form one or more transformations to be executed by a stateless worker at the third tier.

5. The system of claim 1, wherein the instructions further cause the one or more processing units to:
assign buckets associated with the flow to the predetermined set of workers; and
adjust a partition count based on a number of packets associated with the buckets, wherein the partition count defines a number of workers of the plurality of workers.

6. The system of claim 1, wherein the instructions further cause the one or more processing units to:
divide a number of packets of the flow space into a predetermined number of packets for each partition at the second the second tier;
assign an individual partition to an individual worker as an owner of the individual group of partitions; and
replicate at least one of the partitions owned by the individual worker across another worker for allowing the operations to be applied to the at least one of the partitions while the individual worker is taken out of operation.

7. The system of claim 1, wherein an individual decider partition further comprises a plurality of partitions generated based on the flow allocation strategy assigned to the individual decider partition.

8. The system of claim 1, wherein the one or more stateless workers of the scalable flow processing tier are configured to determine that an inbound packet matches a previously processed packet and in response to determining that the inbound packet matches the previously processed packet, performing the identified actions and transformations on the inbound packet to reduce a processing time of the flow cache structure.

9. A non-transitory computer-readable storage medium having encoded thereon a flow cache structure that separates categories of operations into multiple tiers, the flow cache structure comprising a first tier for identifying actions and transformations to be executed for individual packets of a flow, a second tier for managing distributed flow states replicated across multiple workers, and a scalable flow processing tier for executing the identified actions and transformations on individual packets of the flow, the non-transitory computer-readable storage medium comprising computer-executable instructions to cause the one or more processing units of a system to:
Generate, at the first tier, a number of decider partitions based on a number of flow allocation strategies utilized by the flow cache structure for forming the actions and the transformations for individual packets of the flow, wherein individual decider partitions are assigned individual flow allocation strategies for forming the actions and the transformations;

partition, at the second tier, a flow space of the flow across a plurality of workers;

replicate the flow to the plurality of workers at the second tier, wherein the plurality of workers at the second tier are configured to manage distributed flow state decisions for packets of the flow;

select, at the second tier, a worker from the plurality of workers, the selected worker causing a start of a chain of other workers where a flow state for the flow is replicated to enable a decentralized daisy chain structure, the replication of the flow state enables each worker of the decentralized daisy chain structure to perform functionality of the selected worker in response to a failure of the selected worker; and offload, using the number of flow allocation strategies in the number of decider partitions of the first tier, the identified actions and transformations for the packets of the flow to one or more stateless workers for execution at the scalable flow processing tier to generate an output comprising transformed packets formed by the identified actions and transformations.

10. The non-transitory computer-readable storage medium of claim 9, wherein a worker of the plurality of workers at the second tier performs a lookup in a cache associated with the second tier using a flow key associated with an incoming packet, and in response to a cache miss from the lookup, causing a second lookup using an original packet causing a decider from a decider partition to produce a processed packet which is added to the cache associated with the second tier and sending the processed packet as part of the output.

11. The non-transitory computer-readable storage medium of claim 9, wherein the instructions further cause the one or more processing units to:

in response to receiving a packet of the flow at a decider partition at the first tier from a worker at the second tier, determine if a cache of the decider partition at the first tier contains data identifying the packet; and if the cache of the decider partition at the first tier contains the data identifying the packet, cause the decider partition to send the flow with transformations back to the worker at the second tier.

12. The non-transitory computer-readable storage medium of claim 9, wherein the instructions further cause the one or more processing units to:

in response to receiving a packet of the flow at a decider partition at the first tier from a worker at the second tier, determine if a cache of the decider partition at the first tier contains data identifying the packet;

if the cache of the decider partition at the first tier does not contain the data identifying the packet, cause the decider partition to execute a flow allocation and form one or more transformations to be executed by a stateless worker at the third tier.

13. The non-transitory computer-readable storage medium of claim 9, wherein the instructions further cause the one or more processing units to:

assign buckets associated with the flow to the plurality of workers; and adjust a partition count based on a number of packets associated with the buckets, wherein the partition count defines a number of workers of the plurality of workers.

14. The non-transitory computer-readable storage medium of claim 9, wherein the instructions further cause the one or more processing units to:

divide a number of packets of the flow space into a predetermined number of packets for each partition at the second the second tier;

assign an individual partition to an individual worker as an owner of the individual group of partitions; and replicate at least one of the partitions owned by the individual worker across another worker for allowing the operations to be applied to the at least one of the partitions while the individual worker is taken out of operation.

15. A computer-implemented method for improving reliability and scalability of a flow processing system, the computer-implemented method comprises:

obtaining data defining a flow cache structure that separates categories of operations into multiple tiers, the flow cache structure comprising a first tier for identifying actions and transformations to be executed for individual packets of a flow, a second tier for managing distributed flow states replicated across multiple workers, and a scalable flow processing tier for executing the identified actions and transformations on individual packets of the flow;

generating, at the first tier, a number of decider partitions based on a number of flow allocation strategies utilized by the flow cache structure for forming the actions and the transformations for individual packets of the flow, wherein individual decider partitions are assigned individual flow allocation strategies for forming the actions and the transformations;

partitioning, at the second tier, a flow space of the flow across a plurality of workers;

replicating the flow to a set of workers of the plurality of workers at the second tier, wherein the set of workers at the second tier are configured to manage distributed flow state decisions for packets of the flow;

selecting, at the second tier, a worker from the set of workers, the selected worker causing a start of a chain of other workers where a flow state for the flow is replicated to enable a decentralized daisy chain structure, the replication of the flow state enabling each worker of the decentralized daisy chain structure to perform functionality of the selected worker in response to a failure of the selected worker; and offloading, using the number of flow allocation strategies in the number of decider partitions of the first tier, the identified actions and transformations for the packets of the flow to one or more stateless workers for execution at the scalable flow processing tier to generate an output comprising transformed packets formed by the identified actions and transformations.

16. The computer-implemented method of claim 15, wherein a worker of the predetermined set of workers at the second tier performs a lookup in a cache associated with the second tier using a flow key associated with an incoming packet, and cause an execution of one or more transformations for the packet and sending the packet as part of the output in response to a cache hit from the lookup.

17. The computer-implemented method of claim 15, wherein a worker of the predetermined set of workers at the second tier performs a lookup in a cache associated with the second tier using a flow key associated with an incoming packet, and in response to a cache miss from the lookup, causing a second lookup using an original packet causing a decider from a decider partition to produce a processed packet which is added to the cache associated with the second tier and sending the processed packet as part of the output.

18. The computer-implemented method of claim 15, wherein the method further comprises:
in response to receiving a packet of the flow at a decider partition at the first tier from a worker at the second tier, determining if a cache of the decider partition at the first tier contains data identifying the packet; and
if the cache of the decider partition at the first tier contains the data identifying the packet, causing the decider partition to send the flow with transformations back to the worker at the second tier.

19. The computer-implemented method of claim 15, wherein the method further comprises:
in response to receiving a packet of the flow at a decider partition at the first tier from a worker at the second tier, determining if a cache of the decider partition at the first tier contains data identifying the packet;
if the cache of the decider partition at the first tier does not contain the data identifying the packet, causing the decider partition to execute a flow allocation and form one or more transformations to be executed by a stateless worker at the third tier.

20. The computer-implemented method of claim 15, wherein the method further comprises:
assigning buckets associated with the flow to the predetermined set of workers; and
adjusting a partition count based on a number of packets associated with the buckets, wherein the partition count defines a number of workers of the plurality of workers.

* * * * *